US012605793B2

(12) United States Patent
Kinashi et al.

(10) Patent No.: US 12,605,793 B2
(45) Date of Patent: Apr. 21, 2026

(54) ARC WELDING METHOD

(71) Applicant: Kobe Steel, Ltd., Kobe (JP)

(72) Inventors: Hikaru Kinashi, Kanagawa (JP); Yasuyuki Yokota, Kanagawa (JP)

(73) Assignee: Kobe Steel, Ltd., Kobe (JP)

( * ) Notice: Subject to any disclaimer, the term of this patent is extended or adjusted under 35 U.S.C. 154(b) by 673 days.

(21) Appl. No.: 18/043,592

(22) PCT Filed: Aug. 11, 2021

(86) PCT No.: PCT/JP2021/029691
§ 371 (c)(1),
(2) Date: Mar. 1, 2023

(87) PCT Pub. No.: WO2022/050014
PCT Pub. Date: Mar. 10, 2022

(65) Prior Publication Data
US 2023/0264304 A1 Aug. 24, 2023

(30) Foreign Application Priority Data

Sep. 2, 2020 (JP) ................................. 2020-147768

(51) Int. Cl.

| | |
|---|---|
| *B23K 35/30* | (2006.01) |
| *B23K 9/12* | (2006.01) |
| *B23K 101/18* | (2006.01) |
| *B23K 103/04* | (2006.01) |
| *C22C 38/00* | (2006.01) |
| *C22C 38/02* | (2006.01) |
| *C22C 38/04* | (2006.01) |
| *C22C 38/06* | (2006.01) |
| *C22C 38/14* | (2006.01) |
| *C22C 38/16* | (2006.01) |
| *C22C 38/20* | (2006.01) |
| *C22C 38/22* | (2006.01) |
| *C22C 38/28* | (2006.01) |
| *C22C 38/32* | (2006.01) |
| *C22C 38/38* | (2006.01) |
| *C22C 38/42* | (2006.01) |
| *C22C 38/50* | (2006.01) |
| *C22C 38/54* | (2006.01) |
| *C22C 38/58* | (2006.01) |

(52) U.S. Cl.
CPC .......... *B23K 35/3073* (2013.01); *B23K 9/124* (2013.01); *C22C 38/001* (2013.01); *C22C 38/002* (2013.01); *C22C 38/02* (2013.01); *C22C 38/04* (2013.01); *C22C 38/06* (2013.01); *C22C 38/14* (2013.01); *C22C 38/16* (2013.01); *C22C 38/20* (2013.01); *C22C 38/22* (2013.01); *C22C 38/28* (2013.01); *C22C 38/32* (2013.01); *C22C 38/38* (2013.01); *C22C 38/42* (2013.01); *C22C 38/50* (2013.01); *C22C 38/54* (2013.01); *C22C 38/58* (2013.01); *B23K 2101/18* (2018.08); *B23K 2103/04* (2018.08)

(58) Field of Classification Search
CPC .. B23K 35/3026; B23K 9/16; B23K 35/0261; B23K 2101/32; B23K 2103/08; B23K 2103/04; B23K 35/3073; B23K 35/40; B23K 35/24; C22C 38/001; C22C 38/002; C22C 38/02; C22C 38/04; C22C 38/06; C22C 38/12; C22C 38/16; C22C 38/20; C22C 38/28; C22C 38/14; C22C 38/38
See application file for complete search history.

(56) References Cited

U.S. PATENT DOCUMENTS

| | | |
|---|---|---|
| 2014/0202993 A1 | 7/2014 | Kawamoto et al. |
| 2016/0129532 A1 | 5/2016 | Saruwatari et al. |
| 2019/0232411 A1 | 8/2019 | Yashima et al. |
| 2019/0375038 A1 | 12/2019 | Kinashi et al. |
| 2020/0353552 A1 | 11/2020 | Yashima et al. |
| 2021/0316386 A1 | 10/2021 | Kinashi et al. |

FOREIGN PATENT DOCUMENTS

| | | |
|---|---|---|
| JP | 6043969 B2 | 12/2016 |
| JP | 2018-20361 A | 2/2018 |
| JP | 2018-144103 A | 9/2018 |
| WO | WO 2015/068273 A1 | 5/2015 |

OTHER PUBLICATIONS

International Search Report issued Oct. 19, 2021 in PCT/JP2021/029691, filed on Aug. 11, 2021, 2 pages.

*Primary Examiner* — Robert G Bachner
(74) *Attorney, Agent, or Firm* — Oblon, McClelland, Maier & Neustadt, L.L.P.

(57) ABSTRACT

An arc welding method includes welding a steel sheet while alternately switching feeding of a welding wire between forward feeding and backward feeding. The welding wire contains, in mass % with respect to a total mass to the welding wire, C: more than 0 and 0.30 or less, Si: 0.01 to 0.30, Mn: 0.5 to 2.5, S: 0.001 to 0.020, Ti: 0.05 to 0.30, and optional elements with the remainder being Fe and unavoidable impurities, and a value obtained by $2\times[Ti]/[Si]-50\times[S]$ is more than 1.0. The welding is performed by using a shielding gas containing $CO_2$ gas in an amount of 80 vol. % or more with respect to a total volume of the shielding gas at a frequency of 40 Hz or more and 200 Hz or less, where one cycle for determining the frequency is one forward feeding and one backward feeding.

19 Claims, No Drawings

ARC WELDING METHOD

This application is a National Stage entry under 35 U.S.C. § 371 of PCT/JP2021/029691, filed on Aug. 11, 2021, and claims priority to Japanese Patent Application No. 2020-147768 filed on Sep. 2, 2020, the entire contents of which are incorporated herein by reference.

TECHNICAL FIELD

The present invention relates to an arc welding method.

BACKGROUND ART

In an arc welding method using a welding wire, various studies have been made on a technique for reducing the amount of sputter during welding. For example, Patent Literature 1 proposes an arc welding method of performing arc welding by repeating short circuits and arcs. Patent Literature 1 discloses that generation of pores such as blowholes and generation of spatter are prevented by controlling a distance between the wire and a molten pool and a welding current to be within appropriate ranges.

In addition, in recent years, there has been an increasing demand for improvement in rust resistance of a welded portion mainly in the field of transport aircrafts, and development of an electrodeposition coating technique or the like for applying a coating film for rust prevention after welding has been advanced.

In the case where a coating film for rust prevention is formed by electrodeposition coating, the slag on a bead surface has insulation property, and thus, the coating of the coating film may be inhibited depending on a state of the slag. In general, the slag remaining on the bead surface after welding is removed by a mechanical method, and then electrodeposition coating is performed, or electrodeposition coating is performed while the slag remains.

However, in the case where the electrodeposition coating is performed while the slag remains on the bead surface, the coating film for rust prevention is unlikely to be formed sufficiently, and the quality of the rust-preventiveness of finished products varies. In addition, in the case where the slag is removed by a mechanical method, the burden on an operator increases.

In Patent Literature 1, the slag generated on the bead surface is not sufficiently studied.

Therefore, Patent Literature 2 discloses an arc welding method that can prevent generation of spatter by controlling feeding of a welding wire in a moving direction, and can improve the agglomeration property of slag by controlling a content of a chemical component of the wire, a shielding gas, and a frequency in the moving direction of the wire. In Patent Literature 2, since the slag is agglomerated, an area to which the slag is not attached is widened. Accordingly, the adhesion of the coating film formed by the electrodeposition coating is further improved.

CITATION LIST

Patent Literature

Patent Literature 1: Japanese Patent No. 6043969
Patent Literature 2: JP2018-144103A

SUMMARY OF INVENTION

Technical Problem

However, when a welded portion has a complicated shape in the case where the arc welding method described in Patent Literature 2 is used, the slag cannot be sufficiently agglomerated, and thus the slag may remain on a bead surface in an area having a complicated shape. As a result, a coating film for rust prevention is not formed by electrodeposition coating, and a desired rust prevention effect is unlikely to be obtained.

In the case where a shielding gas containing a high content of $CO_2$ is used, the amount of slag generated and the amount of spatter generation tend to increase. There is a demand for an arc welding method by which the amount of spatter generated is small and the electrodeposition coating property of a welded portion is good even in the case where a shielding gas containing $CO_2$ in an amount of 80 vol. % or more is used.

The present invention has been made in view of the above problems, and an object of the present invention is to provide an arc welding method by which the amount of spatter generation can be reduced and the electrodeposition coating property of a welded portion can be improved even in the case where a shielding gas containing $CO_2$ gas in an amount of 80 vol. % or more is used.

Solution to Problem

As a result of studying slag that affects the electrodeposition coating property, the present inventors have confirmed that an electrodeposition coating film is not formed on the slag particularly when thick slag containing Si as a main component is scattered on a bead surface.

Therefore, the present inventors have found that, by controlling components in a wire within a specified range, the distribution and slag components of slag generated on a weld bead can be modified, and the electrodeposition coating property can be improved. However, the present inventors have found that when a content of Si is reduced, the viscosity of the wire in a molten state is reduced, and the droplet transfer during pulsed arc welding is unstable, thereby increasing the amount of spatter. In addition, in the case where a shielding gas containing $CO_2$ gas in an amount of 80 vol. % or more was used, the tendency to increase the amount of sputter was remarkable.

As a result of intensive studies for reducing the amount of spatter, the present inventors have found that, by adopting a welding method of welding a steel sheet while alternately switching feeding of a welding wire between forward feeding and backward feeding, and controlling welding conditions, the amount of spatter can be reduced even when a shielding gas containing $CO_2$ gas in an amount of 80 vol. % or more is used.

The above object of the present invention is achieved by the following configuration [1] related to an arc welding method.

[1] An arc welding method, comprising welding a steel sheet while alternately switching feeding of a welding wire between forward feeding and backward feeding, in which the welding wire contains, with respect to a total mass to the welding wire,
C: more than 0 mass % and 0.30 mass % or less,
Si: 0.01 mass % or more and 0.30 mass % or less,
Mn: 0.5 mass % or more and 2.5 mass % or less,
S: 0.001 mass % or more and 0.020 mass % or less,
Ti: 0.05 mass % or more and 0.30 mass % or less,
P: 0 mass % or more and 0.025 mass % or less,
Cu: 0 mass % or more and 0.50 mass % or less,
Ni: 0 mass % or more and 3.0 mass % or less,
Cr: 0 mass % or more and 3.0 mass % or less,
Mo: 0 mass % or more and 1.0 mass % or less, Al: 0 mass % or more and 0.30 mass % or less, and B: 0 mass % or more and 0.0100 mass % or less, with the remainder being Fe and unavoidable impurities, a value obtained by the following formula (1) is more than 1.0, $$2 \times [Ti]/[Si] - 50 \times [S] \tag{1}$$

in the formula (1), [Ti] represents the content (mass %) of Ti with respect to the total mass of the welding wire, [Si] represents the content (mass %) of Si with respect to the total mass of the welding wire, and [S] represents the content (mass %) of S with respect to the total mass of the welding wire, and welding is performed using a shielding gas containing $CO_2$ gas in an amount of 80 vol. % or more with respect to a total volume of the shielding gas at a frequency of 40 Hz or more and 200 Hz or less, where one cycle for determining the frequency is one forward feeding and one backward feeding.

A preferred embodiment of the present invention related to the arc welding method relates to the following [2] to [8].

[2] The arc welding method according to [1], in which the welding is performed at a peak current of 200 A or more.

[3] The arc welding method according to [1] or [2], in which the welding is performed using a shielding gas being 100 vol. % of $CO_2$ gas.

[4] The arc welding method according to any one of [1] to [3], in which the content of Al is 0.01 mass % or more with respect to the total mass of the welding wire.

[5] The arc welding method according to any one of [1] to [4], in which the content of Mo is 0.01 mass % or more and 0.5 mass % or less with respect to the total mass of the welding wire.

[6] The arc welding method according to any one of [1] to [5], in which the welding wire further contains N, and a content of N is more than 0 mass % and 0.0150 mass % or less with respect to the total mass of the welding wire.

[7] The arc welding method according to any one of [1] to [6], in which the welding wire further contains O, and a content of O is more than 0 mass % and 0.0200 mass % or less with respect to the total mass of the welding wire.

[8] The arc welding method according to any one of [1] to [7], in which the steel sheet has a thickness of 0.6 mm or more and 6 mm or less.

Advantageous Effects of Invention

The present invention can provide an arc welding method by which the amount of spatter generation can be reduced and the electrodeposition coating property of a welded portion can be improved even in the case where a shielding gas containing $CO_2$ gas in an amount of 80 vol. % or more is used.

DESCRIPTION OF EMBODIMENTS

Hereinafter, embodiments of the present invention will be described in detail. The present invention is not limited to the embodiments described below. In addition, in the present specification, "to" indicating a numerical range is used to mean that numerical values described therebefore and thereafter are included as a lower limit and an upper limit.

First, an arc welding method according to the present invention will be described in detail.

[Arc Welding Method]

The arc welding method according to the present embodiment is an arc welding method of welding a steel sheet while alternately switching feeding of a welding wire between forward feeding and backward feeding. Hereinafter, such a control method of the welding wire may be referred to as a "wire feeding control method" or simply a "feeding control method".

More specifically, the feeding control method is a welding method in which the following procedures are repeated: the wire is advanced (forward fed) accompanying with generating an arc while the feeding of the wire is controlled in the moving direction, the wire is retreated (backward fed) after a molten metal of a melted wire end is brought into contact with a molten pool to extinguish the arc, and the molten metal is transferred.

Regarding the frequency (vibration frequency) of the wire feeding in the welding method according to the present embodiment, one cycle is one advancing (forward feeding) and one retreating (backward feeding) in the wire. Examples of the welding method according to the present embodiment include cold metal transfer welding and the like.

<Frequency of Wire Feeding: 40 Hz or More and 200 Hz or Less>

The surface tension and viscosity of the molten metal of the wire end during welding are greatly affected by chemical components of the wire. Therefore, in the arc welding of the present embodiment, a frequency band of the wire feeding is controlled in consideration of the chemical components of the wire to be used.

When the frequency of wire feeding is less than 40 Hz, droplets grow too much, and even if the wire is caused to move backward, an arc is generated before the droplets are completely separated from the wire end, and thus large-grain sputter is generated. On the other hand, when the frequency of the wire feeding is more than 200 Hz, a time sufficient for droplets to separate from the wire end cannot be obtained, and regular short-circuit control is disturbed, leading to sputtering. In the case where a base metal is a zinc plating steel sheet, it is effective to depress a molten metal in order to separate zinc vapor from the molten metal. However, when the frequency of the wire feeding is more than 200 Hz, the effect of depressing a molten metal immediately below an arc is hardly obtained, and thus a pore defect is likely to occur. Therefore, the frequency of the wire feeding in which feeding that is one forward feeding and one backward feeding is defined as one cycle is set to 40 Hz or more and 200 Hz or less. In the arc welding according to the present embodiment, by setting the frequency of wire feeding within a range of 40 Hz or more and 200 Hz or less, the amount of large-grain spatter can be reduced even when a shielding gas containing $CO_2$ gas in an amount of 80 vol. % or more with respect to the total volume of the shielding gas is used.

The frequency of wire feeding is preferably 50 Hz or more, more preferably 60 Hz or more, and particularly preferably 70 Hz or more. The frequency of wire feeding is preferably 160 Hz or less, more preferably 140 Hz or less, and particularly preferably 120 Hz or less.

<Chemical Component of Welding Wire>

Next, regarding the chemical components of the welding wire that can be used in the arc welding method according to the present embodiment, the addition reason and the reason for limiting numerical values will be described in detail. The welding wire according to the present embodiment is preferably a solid wire.

5

6

(C: More than 0 Mass % and 0.30 Mass % or Less)

C is a component having a deoxidation action and an effect of increasing the strength of the weld metal. When the welding wire that can be used in the present embodiment contains C even in a small amount, the strength of the weld metal can be adjusted. Therefore, the content of C in the wire is more than 0 mass %, preferably 0.01 mass % or more, and more preferably 0.03 mass % or more with respect to the total mass of the wire.

On the other hand, when the content of C in the wire is more than 0.30 mass %, the deoxidation action is increased, and the viscosity of the droplets is increased. Therefore, because a short circuit is likely to occur, generation of sputter is likely to occur. In addition, C is combined with oxygen, so that CO is generated in the vicinity of the arc, spatter due to explosion is likely to be generated, and the amount of fumes increases. Therefore, the content of C in the wire is 0.30 mass % or less, preferably 0.25 mass % or less, and more preferably 0.20 mass % or less with respect to the total mass of the wire.

(Si: 0.01 Mass % or More and 0.30 Mass % or Less)

In the case where thick slag containing Si as a main component is scattered on a bead surface, an electrodeposition coating film cannot be formed on the slag. Therefore, in the present embodiment, thin slag having excellent adhesion is formed on a weld bead by reducing the content of Si in the wire. Since the electrodeposition coating film can be formed on a surface of the thin slag, the electrodeposition coating property of the welded portion can be improved. In addition, when the content of Si in the wire is decreased, the electric resistance of the wire is decreased, and accordingly, the wire is less likely to be melted during arc welding. Therefore, a required welding current is increased, and as a result, the pore defects such as pits and blowholes can be prevented by increasing an arc force.

When the content of Si in the wire is less than 0.01 mass %, the viscosity of a molten metal portion of the wire end is significantly reduced during arc generation, and the deoxidation effect is insufficient. Therefore, droplet transfer during arc welding is unstable, scattering of droplets occurs, and the amount of spatter increases. Therefore, the content of Si in the wire is 0.01 mass % or more, preferably 0.02 mass % or more, and more preferably 0.05 mass % or more with respect to the total mass of the wire.

On the other hand, when the content of Si in the wire is more than 0.30 mass %, the formed slag is likely to agglomerate due to bonding of Si with oxygen, and the thickness of the slag increases. As a result, an electrodeposition coating film is less likely to be formed on a surface of the slag, and coating defects occur. Therefore, the content of Si in the wire is 0.30 mass % or less, preferably 0.25 mass % or less, and more preferably 0.20 mass % or less with respect to the total mass of the wire.

(Mn: 0.5 Mass % or More and 2.5 Mass % or Less)

Mn is an effective deoxidizing agent and is an element that is easily bonded to S.

When the content of Mn in the wire is less than 0.5 mass %, the deoxidation and desulfurization effects are impaired, the surface tension decreases, and pore defects such as pits and blowholes are likely to occur. Therefore, the content of Mn in the wire is 0.5 mass % or more, preferably 0.8 mass % or more, and more preferably 1.0 mass % or more with respect to the total mass of the wire.

On the other hand, when the content of Mn in the wire is more than 2.5 mass %, a thin oxide film which is less likely to be peeled is generated on a bead surface. Therefore, the content of Mn is 2.5 mass % or less, preferably 2.4 mass % or less, and more preferably 2.3 mass % or less with respect to the total mass of the wire.

(S: 0.001 Mass % or More and 0.020 Mass % or Less)

S is an element that greatly affects the surface tension of a molten metal, such as smoothing a bead starting end shape. When the content of S in the wire is less than 0.001 mass %, the above effect cannot be obtained. Therefore, the content of S is 0.001 mass % or more, and preferably 0.002 mass % or more with respect to the total mass of the wire.

On the other hand, when the content of S in the wire is more than 0.020 mass %, the slag is locally collected, and the slag thickness is increased, so that the electrodeposition coating property deteriorates. Therefore, the content of S is 0.020 mass % or less, preferably 0.018 mass % or less, and more preferably 0.015 mass % or less with respect to the total mass of the wire.

(Ti: 0.05 Mass % or More and 0.30 Mass % or Less)

Ti is one of the most important elements in the wire that can be used in the present embodiment, and is a component having a deoxidation action and an action of changing the physical properties of slag. Although the mechanism related to the influence of Ti is not necessarily clear, the present inventors have found that Ti tends to be generated in a manner of covering the periphery in composite slag containing Si, Mn, and Ti when the wire contains Ti in an appropriate amount. Such slag not only has good electrodeposition coating property, but also has good adhesion between the slag and the base metal, so that corrosion hardly proceeds.

When the content of Ti in the wire is less than 0.05 mass %, a desired slag state is unlikely to be obtained. Therefore, the content of Ti in the wire is 0.05 mass % or more, preferably 0.08 mass % or more, and more preferably 0.10 mass % or more with respect to the total mass of the wire.

On the other hand, when the content of Ti in the wire is more than 0.30 mass %, the deoxidation proceeds excessively, and the generation amount of slag increases excessively, and thus the slag becomes thick, and the deoxidation action proceeds excessively, which leads to deterioration of the bead shape. Therefore, the content of Ti in the wire is 0.30 mass % or less, preferably 0.25 mass % or less, and more preferably 0.23 mass % or less with respect to the total mass of the wire.

(P: 0 Mass % or More and 0.025 Mass % or Less)

Although P is an element that lowers the cracking resistance of the weld metal, the content of P in the wire may be 0 mass % because the cracking resistance of the weld metal can also be lowered by other elements.

On the other hand, when the content of P in the wire is more than 0.025 mass %, the required crack resistance of the weld metal cannot be obtained. Therefore, the content of P is 0.025 mass % or less, preferably 0.020 mass % or less, and more preferably 0.015 mass % or less with respect to the total mass of the wire.

(Cu: 0 Mass % or More and 0.50 Mass % or Less)

Although Cu is an element that lowers the cracking resistance of the weld metal, the content of Cu in the wire may be 0 mass % because the cracking resistance of the weld metal can also be lowered by other elements. Therefore, the content of Cu in the wire is 0 mass % or more, preferably 0.01 mass % or more, and more preferably 0.05 mass % or more with respect to the total mass of the wire.

On the other hand, when the content of Cu in the wire is more than 0.50 mass %, the required crack resistance of the weld metal cannot be obtained. Therefore, the content of Cu in the wire is 0.50 mass % or less, preferably 0.30 mass % or less, and more preferably 0.25 mass % or less with respect to the total mass of the wire.

(Ni: 0 Mass % or More and 3.0 Mass % or Less)

Although Ni is not a component that affects the generation amount of slag, Ni can be contained in the wire for the purpose of adjusting the strength of the weld metal because the content of Si in the wire is reduced in the present embodiment. Therefore, the content of Ni in the wire is 0 mass % or more, preferably 0.01 mass % or more, and more preferably 0.10 mass % or more with respect to the total mass of the wire.

On the other hand, when the content of Ni in the wire is more than 3.0 mass %, the strength of the weld metal significantly increases, and the toughness decreases. Therefore, the content of Ni in the wire is 3.0 mass % or less, preferably 2.5 mass % or less, and more preferably 2.0 mass % or less with respect to the total mass of the wire.

(Cr: 0 Mass % or More and 3.0 Mass % or Less)

Although Cr is not a component that affects the generation amount of slag, Cr can be contained in the wire for the purpose of adjusting the strength of the weld metal because the content of Si in the wire is reduced in the present embodiment. Therefore, the content of Cr in the wire is 0 mass % or more, preferably 0.01 mass % or more, and more preferably 0.1 mass % or more with respect to the total mass of the wire.

On the other hand, when the content of Cr in the wire is more than 3.0 mass %, the strength of the weld metal significantly increases, and the toughness decreases. Therefore, the content of Cr in the wire is 3.0 mass % or less, preferably 2.5 mass % or less, and more preferably 2.0 mass % or less with respect to the total mass of the wire.

(Mo: 0 Mass % or More and 1.0 Mass % or Less)

Although Mo is not a component that affects the generation amount of slag, Mo can be contained in the wire for the purpose of adjusting the strength of the weld metal because the content of Si in the wire is reduced in the present embodiment. Therefore, the content of Mo in the wire is 0 mass % or more with respect to the total mass of the wire.

On the other hand, when the content of Mo in the wire is more than 1.0 mass %, the strength of the weld metal significantly increases, and the toughness decreases. Therefore, the content of Mo in the wire is 1.0 mass % or less, preferably 0.8 mass % or less, and more preferably 0.5 mass % or less with respect to the total mass of the wire.

(Al: 0 Mass % or More and 0.30 Mass % or Less)

Al is an element that has high affinity with O and N, forms an oxide or a nitride, and improves hardenability. In the present embodiment, Al can be contained in the wire. Therefore, the content of Al in the wire is 0 mass % or more, preferably 0.01 mass % or more, and more preferably 0.03 mass % or more with respect to the total mass of the wire.

On the other hand, Al is an element that has a deoxidation action and agglomerates slag generated on a surface of a molten metal while slagging out as an oxide to reduce the adhesion of the slag to the weld metal. When the content of Al in the wire is more than 0.30 mass %, the slag is agglomerated, and an electrodeposition coating film is unlikely to be formed on the slag. Therefore, the content of Al in the wire is 0.30 mass % or less, preferably 0.20 mass % or less, and more preferably 0.10 mass % or less with respect to the total mass of the wire.

(B: 0 Mass % or More and 0.0100 Mass % or Less)

Since B is an element having an effect of improving the strength of the weld metal, B can be contained in the wire for the purpose of adjusting the strength of the weld metal.

Therefore, the content of B in the wire is 0 mass % or more, and preferably 0.0010 mass % or more.

On the other hand, when the content of B in the wire is more than 0.0100 mass %, the strength of the weld metal significantly increases, and the toughness decreases. In addition, B is a factor that induces welding defects such as hot crack of a welded portion depending on the steel sheet components. Therefore, the content of B in the wire is 0.0100 mass % or less, preferably 0.0080 mass % or less, and more preferably 0.0060 mass % or less with respect to the total mass of the wire.

(Remainder: Fe and Unavoidable Impurity)

The remainder of the wire that can be used in the present embodiment is Fe and unavoidable impurities. Examples of the unavoidable impurities include V, Zr, Nb, Li, Sn, Sb, Bi, and As. The content of these unavoidable impurities is preferably 0.0100 mass % or less, and more preferably 0.0050 mass % or less with respect to the total mass of the wire.

The total content of these unavoidable impurities is preferably 0.0200 mass % or less with respect to the total mass of the wire.

(O: More than 0 Mass % and 0.0200 Mass % or Less)

Although O is not an essential component, O can be contained in the wire within a predetermined content range because O is an element that affects the generation amount of slag and has an effect of reducing the surface tension and improving the affinity of the bead. In the case where O is contained in the wire, the content of O in the wire is more than 0 mass %, preferably 0.0010 mass % or more, and more preferably 0.0030 mass % or more with respect to the total mass of the wire.

On the other hand, when the content of O in the wire is more than 0.0200 mass %, the surface tension of the molten metal is too low, the amount of the spatter increases, and the bead shape deteriorates. Therefore, the content of O in the wire is 0.0200 mass % or less, preferably 0.0150 mass % or less, and more preferably 0.0120 mass % or less with respect to the total mass of the wire.

(N: More than 0 Mass % and 0.0150 Mass % or Less)

Although N is not an essential component, N can be contained in the wire within a predetermined content range because N is an element having an effect of reducing the surface tension of a molten metal and improving the affinity of the bead, and is an element that improves the strength of the weld metal and improves the fatigue resistance. In the case where N is contained in the wire, the content of N in the wire is more than 0 mass %, preferably 0.0010 mass % or more, and more preferably 0.0025 mass % or more with respect to the total mass of the wire.

On the other hand, when the content of N in the wire is more than 0.0150 mass %, the surface tension of the molten metal is too low, the amount of the spatter increases, and the bead shape deteriorates. In addition, coarse nitrides are formed in the weld metal structure, and the toughness decreases. Therefore, the content of N in the wire is 0.0150 mass % or less, preferably 0.0130 mass % or less, and more preferably 0.0110 mass % or less with respect to the total mass of the wire.

(Value Obtained by Formula (1): More than 1.0)

Ti, Si, and S are elements that affect the agglomeration of slag. Specifically, the slag is agglomerated by increasing the content of Si and the content of S in the wire, and the slag can be dispersed by increasing the content of Ti in the wire. When the value obtained by the following formula (1) is 1.0 or less, the adhesion of the slag is reduced, and the bead shape is also poor. In addition, the amount of spatter generation also increases. Therefore, the value obtained by the following formula (1) is more than 1.0, preferably more than 1.5, and more preferably more than 2.0.

$$2\times[Ti]/[Si]-50\times[S] \qquad \text{Formula (1)}$$

Here, [Ti] represents a content (mass %) of Ti with respect to the total mass of the welding wire, [Si] represents a content (mass %) of Si with respect to the total mass of the welding wire, and [S] represents a content (mass %) of S with respect to the total mass of the welding wire.

<Shielding Gas>

In general, when the amount of a $CO_2$ gas in the shielding gas used during the arc welding is reduced, and the amount of Ar gas is increased, the generation amount of slag can be reduced, and the electrodeposition coating property of a welded portion is improved. However, when the proportion of the Ar gas in the shielding gas is increased, the Ar gas in an increased amount causes an increase in the cost of the gas to be used because the Ar gas is more expensive than the $CO_2$ gas.

On the other hand, in a welding method according to the related art, when arc welding is performed in a shielding gas atmosphere containing $CO_2$ gas in an amount of 80 vol. % or more, the amount of spatter generation increases, and the bead shape also deteriorates. In the present embodiment, by controlling the wire components and the wire feed control condition, the amount of spatter generation and the generation amount of slag can be reduced, and welding excellent in weldability and excellent in electrodeposition coating property of the welded portion can be performed even when the amount of $CO_2$ in the shielding gas is 80 vol. % or more.

When the amount of the $CO_2$ gas in the shielding gas is less than 80 vol. %, the amount of expensive Ar gas or the like used increases, and the cost of the shielding gas increases. In addition, from the viewpoint of ensuring the weld penetration, the amount of the $CO_2$ gas in the shielding gas is preferably 80 vol. % or more, more preferably 95 vol. % or more, and most preferably 100 vol. % with respect to the total volume of the shielding gas. In addition to the $CO_2$ gas, Ar gas, He gas, 02 gas, and the like may be contained in the shielding gas.

<Peak Current: 200 A or More>

In the present embodiment, as described above, the wire feeding control method is adopted in which a steel sheet is welded while alternately switching feeding of the welding wire between forward feeding and backward feeding. That is, a feeding direction of the wire is changed between the forward feeding and the backward feeding in accordance with waveforms of a current and a voltage in which an arc period and a short circuit period are repeated.

In the arc welding according to the present embodiment, droplets are formed in a period of a peak current, and at the same time, an electromagnetic pinch force is generated to form a necking in the droplets. When the peak current is less than 200 A, the droplet pinch force is insufficient, the droplets extend long, and regular short-circuit control is unlikely to be performed. In addition, an arc force is decreased, the effect of depressing the molten metal immediately below the arc is reduced, and pore defects are likely to occur. Therefore, the peak current is preferably 200 A or more, and more preferably 250 A or more. The upper limit of the peak current is not particularly limited, and in terms of the upper limit, the peak current is actually 450 A or less, and preferably 400 A or less.

<Base Current: 100 A or Less>

In the arc welding according to the present embodiment, by lowering the arc force, not only droplets formed by the peak current can be easily separated, but also the effect of preventing spatter scattering that occurs during a short circuit can be obtained. However, when the base current is more than 100 A, the energy during short circuit increases, and large-grain sputter is likely to occur. Therefore, the base current is preferably 100 A or less, and more preferably 70 A or less. The lower limit of the base current is not particularly limited, and in terms of the lower limit, the base current is actually 15 A or more, preferably 20 A or more, and more preferably 25 A or more.

<Base Metal>

In the arc welding method according to the present embodiment, the steel kind of a base metal to be welded is not particularly limited, and for example, steel sheets having various compositions, such as SPH440 (steel sheet with a tensile strength of 440 MPa grade), SPH590 (steel sheet with a tensile strength of 590 MPa grade), and SPH780 (steel sheet with a tensile strength of 780 MPa grade), which are hot rolled steel sheets, can be used. In addition, a thickness is not particularly limited, and when the thickness of a steel sheet is 0.6 mm or more, welding in which burn-through is prevented can be performed. When the thickness is 6 mm or less, the throat depth generally required for one-pass construction can be ensured even in the case of a lap joint or the like. Therefore, the thickness of the steel sheet is preferably 0.6 mm or more and 6 mm or less.

Various plating treatments such as zinc plating and aluminum plating may be applied to the surface of the base metal.

<Other Welding Conditions>

The welding conditions, such as the welding voltage, the travel speed, and the welding position, in the arc welding method according to the present embodiment are not particularly limited, and may be appropriately adjusted within a range applicable to the arc welding method. The travel speed is, for example, 60 cm/min or more.

In addition, the wire diameter (diameter) of the wire that can be used in the arc welding method according to the present embodiment is not particularly limited, and can be applied to a wire having a diameter specified in the welding material standard such as AWS or JIS.

EXAMPLES

Hereinafter, the present embodiment is described in more detail with reference to Examples, but the present invention is not limited to these Examples, and can be carried out by adding changes within the scope of the present invention, and all of which are included in the technical scope of the present invention.

[Test I]

Inventive Examples (Tests No. 1 to No. 21) and Comparative Examples (Tests No. 22 to No. 33)

First, in order to evaluate effects for slag generation, sputter, and the like in the case of controlling the chemical components of the wire and the welding conditions, wires having various chemical components shown in the following Tables 1 and 2 and having a diameter of 1.2 mm were prepared. Next, arc welding was performed on a steel sheet while alternately switching the feeding of the wire between forward feeding and backward feeding under the following welding conditions, and slag adhesion, an electrodeposition coating property, a bead shape, and spatter were evaluated. The evaluation results are also shown in Table 3 below.

The SPH440 steel sheet is a steel sheet which is used most frequently in applications targeted by the present invention, so that the SPH440 steel sheet was used as the base metal in Test I. In addition, an appropriate voltage was appropriately set as the set voltage.

(Welding Condition)

Steel sheet: an SPH440 steel sheet with 200 mm length× 50 mm width×2.3 mm thickness Welding position: horizontal lap joint welding Shielding gas: 100 vol. % $CO_2$ gas Peak current: 300 A Base current: 40 A Wire feed speed: 6.7 m/min Travel speed: 100 cm/min Welding length: 150 mm In Tables 1 and 2, the "chemical component (mass %) of the wire" represents the content (mass %) of each element with respect to the total mass of the wire. In addition, the content of Cu includes the content of Cu plating. In addition, "-" in Tables 1 and 2 means that the component is not added during the producing the wire, or the component contained in the wire is equal to or less than a detection limit value.

An evaluation method and an evaluation standard of each evaluation will be described below.

<Slag Adhesion>

The slag adhesion was evaluated by attaching a cellophane adhesive tape (width: 12 mm to 19 mm) specified in JIS Z1522: 2009 to a surface of a weld metal and peeling off the cellophane adhesive tape.

The slag adhesion was evaluated in three stages by visually observing the amount of slag adhering to a target surface of the test, which is a part, attached to the bead surface, of an adhesive surface of the cellophane adhesive tape.

As the evaluation criteria of the slag adhesion, a case where the slag was not attached to the target surface was evaluated as "∘∘" (excellent), a case where the slag was slightly attached to the target surface but the area of the target surface to which the slag was attached was less than 20% with respect to the total area of the target surface was evaluated as "∘" (good), and a case where the area of the target surface to which the slag was attached was 20% or more with respect to the total area of the target surface was evaluated as "x" (poor).

<Electrodeposition Coating Property>

The electrodeposition coating property was evaluated in three stages by visually observing the generation state of slag on a bead surface. Specifically, it was observed whether glossy slag or brown slag was generated within a welding length range of 150 mm to 200 mm. The glossy slag is slag containing Si as a main component, and the brown slag is thick slag having a thickness of 20 m or more. Therefore, it is indicated that no electrodeposition coating film based on electrodeposition coating is formed on the surface of the slag.

As the evaluation criteria of the electrodeposition coating property, a case where both the generation rates of the glossy slag and the brown slag with respect to the total area within the observation range were 0% was evaluated as "∘∘" (excellent), a case where the generation rate of the glossy slag was 0% even when the brown slag was generated was evaluated as "∘" (good), and a case where the glossy slag was generated was evaluated as "x" (poor).

<Bead Shape>

The bead shape was evaluated in three stages by visually observing the uniformity of the bead edge and the bead shape within a welding length range of 150 mm to 200 mm.

As the evaluation criteria of the bead shape, a bead having excellent uniformity of the bead edge and an excellent bead shape was evaluated as "∘∘" (excellent), a bead which is inferior to the excellent bead ("∘∘") but can be practically used was evaluated as "∘" (acceptable), and a bead having welding defects was evaluated as "x" (poor).

<Sputter>

Sputter was evaluated in four stages by visually observing the amount of spatter generation, the presence or absence of large-grain spatter generated, and the presence or absence of spatter deposition on a workpiece during arc welding.

As the evaluation criteria of sputter, a case where large-grain sputter did not occur and no spatter deposition on the workpiece was observed was evaluated as "∘∘" (excellent), a case where large-grain sputter occurred but the large-grain sputter is a small amount, and spatter deposition on the workpiece did not cause a problem was evaluated as "∘" (good), and a case where large-grain sputter occurred in a large amount and spatter deposition on the workpiece was remarkable was evaluated as "x" (poor).

TABLE 1

| Wire No. | Chemical component of wire (mass %, remainder: Fe and unavoidable impurities) | | | | | | | | | | | | | | Value obtained by formula (1) |
| | C | Si | Mn | P | S | Cu | Ti | Al | Ni | Cr | Mo | B | N | O | |
|---|---|---|---|---|---|---|---|---|---|---|---|---|---|---|---|
| Inventive Example — 1 | 0.04 | 0.09 | 2.00 | 0.007 | 0.007 | 0.25 | 0.20 | 0.012 | — | 0.04 | — | — | 0.0056 | 0.0023 | 4.09 |
| 2 | 0.05 | 0.23 | 1.92 | 0.015 | 0.006 | 0.17 | 0.19 | 0.001 | — | — | — | — | 0.0020 | 0.0110 | 1.35 |
| 3 | 0.04 | 0.07 | 1.98 | 0.004 | 0.004 | 0.25 | 0.20 | 0.012 | — | 0.04 | — | — | 0.0055 | 0.0023 | 5.51 |
| 4 | 0.04 | 0.08 | 2.03 | 0.005 | 0.006 | 0.25 | 0.20 | 0.012 | — | 0.04 | — | — | 0.0051 | 0.0023 | 4.70 |
| 5 | 0.04 | 0.08 | 2.02 | 0.004 | 0.005 | 0.25 | 0.20 | 0.012 | — | 0.04 | — | — | 0.0054 | 0.0023 | 4.75 |
| 6 | 0.04 | 0.07 | 1.99 | 0.005 | 0.006 | 0.25 | 0.20 | 0.012 | — | 0.04 | — | — | 0.0055 | 0.0023 | 5.41 |
| 7 | 0.05 | 0.10 | 2.10 | 0.008 | 0.003 | 0.17 | 0.20 | 0.017 | — | — | — | — | 0.0079 | 0.0045 | 3.85 |
| 8 | 0.05 | 0.12 | 2.15 | 0.008 | 0.003 | 0.17 | 0.19 | 0.016 | — | — | — | — | 0.0100 | 0.0048 | 3.02 |
| 9 | 0.05 | 0.03 | 1.93 | 0.015 | 0.003 | 0.24 | 0.08 | 0.001 | — | — | — | | 0.0026 | 0.0022 | 5.18 |
| 10 | 0.05 | 0.10 | 1.97 | 0.006 | 0.003 | 0.24 | 0.21 | 0.012 | — | 0.04 | 0.01 | — | 0.0047 | 0.0026 | 4.05 |
| 11 | 0.05 | 0.09 | 2.02 | 0.006 | 0.003 | 0.24 | 0.23 | 0.012 | — | 0.04 | — | — | 0.0047 | 0.0021 | 4.96 |
| 12 | 0.05 | 0.12 | 2.15 | 0.008 | 0.003 | 0.18 | 0.16 | 0.015 | — | — | — | — | 0.0100 | 0.0020 | 2.51 |
| 13 | 0.09 | 0.03 | 1.73 | 0.008 | 0.003 | 0.25 | 0.12 | 0.001 | 0.34 | 0.02 | — | 0.0028 | 0.0047 | 0.0051 | 7.85 |
| 14 | 0.09 | 0.03 | 1.54 | 0.005 | 0.007 | 0.17 | 0.18 | 0.020 | 0.02 | 0.03 | — | 0.0036 | 0.0027 | 0.0024 | 11.65 |
| 15 | 0.05 | 0.19 | 2.09 | 0.010 | 0.010 | 0.18 | 0.20 | 0.001 | — | — | — | — | 0.0046 | 0.0030 | 1.61 |
| 16 | 0.06 | 0.06 | 1.50 | 0.004 | 0.006 | 0.18 | 0.19 | 0.024 | — | — | — | 0.0018 | 0.0045 | 0.0090 | 6.02 |
| 17 | 0.05 | 0.20 | 2.12 | 0.007 | 0.015 | 0.16 | 0.20 | 0.001 | — | — | — | — | 0.0040 | 0.0025 | 1.25 |
| 18 | 0.10 | 0.07 | 1.87 | 0.011 | 0.003 | 0.18 | 0.21 | 0.001 | — | 0.01 | 0.24 | — | 0.0018 | 0.0075 | 5.85 |
| 19 | 0.07 | 0.19 | 1.38 | 0.008 | 0.006 | 0.17 | 0.17 | 0.001 | — | — | — | — | 0.0055 | 0.0040 | 1.49 |

TABLE 1-continued

| Wire | Chemical component of wire (mass %, remainder: Fe and unavoidable impurities) | | | | | | | | | | | | | | Value obtained by |
|---|---|---|---|---|---|---|---|---|---|---|---|---|---|---|---|
| No. | C | Si | Mn | P | S | Cu | Ti | Al | Ni | Cr | Mo | B | N | O | formula (1) |
| 20 | 0.05 | 0.06 | 1.86 | 0.010 | 0.002 | 0.18 | 0.20 | 0.011 | — | — | — | — | 0.0034 | 0.0097 | 6.57 |
| 21 | 0.05 | 0.11 | 1.84 | 0.009 | 0.004 | 0.24 | 0.19 | 0.015 | — | 0.04 | — | — | 0.0041 | 0.0033 | 3.25 |

Formula (1): 2 × [Ti]/[Si] − 50 × [S] . . . (1)
Here, [Ti], [Si], [S] respectively represent contents of Ti, Si, and S relative to a total mass of welding wire.

TABLE 2

| | Wire | Chemical component of wire (mass %, remainder: Fe and unavoidable impurities) | | | | | | | | | | | | | | Value obtained by |
|---|---|---|---|---|---|---|---|---|---|---|---|---|---|---|---|---|
| | No. | C | Si | Mn | P | S | Cu | Ti | Al | Ni | Cr | Mo | B | N | O | formula (1) |
| Comparative | 22 | 0.06 | 0.41 | 1.94 | 0.007 | 0.001 | 0.22 | 0.07 | 0.001 | — | 0.03 | — | — | 0.0045 | 0.0020 | 0.29 |
| Example | 23 | 0.05 | 0.61 | 1.92 | 0.015 | 0.006 | 0.17 | 0.19 | 0.001 | — | — | — | — | 0.0019 | 0.0085 | 0.32 |
| | 24 | 0.05 | 0.40 | 1.93 | 0.012 | 0.007 | 0.16 | 0.03 | 0.001 | — | — | — | — | 0.0028 | 0.0076 | −0.20 |
| | 25 | 0.05 | 0.31 | 1.36 | 0.011 | 0.005 | 0.24 | 0.01 | 0.008 | — | 0.45 | — | — | 0.0046 | 0.0025 | −0.19 |
| | 26 | 0.06 | 0.59 | 1.19 | 0.010 | 0.011 | 0.24 | 0.06 | 0.001 | — | — | — | — | 0.0036 | 0.0025 | −0.35 |
| | 27 | 0.05 | 0.55 | 1.09 | 0.005 | 0.009 | 0.26 | 0.001 | 0.001 | — | 1.38 | 0.53 | — | 0.0100 | 0.0030 | −0.45 |
| | 28 | 0.06 | 0.12 | 2.15 | 0.007 | 0.002 | 0.18 | 0.19 | 0.015 | — | — | — | — | 0.0400 | 0.0048 | 3.07 |
| | 29 | 0.05 | 0.12 | 2.06 | 0.007 | 0.002 | 0.18 | 0.13 | 0.008 | — | — | — | — | 0.0180 | 0.0020 | 2.07 |
| | 30 | 0.05 | 0.46 | 1.32 | 0.008 | 0.003 | 0.22 | 0.11 | 0.001 | 2.57 | 0.20 | 0.50 | — | 0.0040 | 0.0024 | 0.33 |
| | 31 | 0.08 | 0.41 | 1.91 | 0.004 | 0.002 | 0.21 | 0.08 | 0.001 | 0.02 | 0.03 | — | 0.0060 | 0.0030 | 0.0042 | 0.29 |
| | 32 | 0.05 | 0.50 | 0.80 | 0.010 | 0.030 | 0.19 | 0.001 | 0.200 | 0.10 | 0.50 | 0.50 | — | 0.0033 | 0.0060 | −1.50 |
| | 33 | 0.05 | 0.78 | 1.25 | 0.007 | 0.003 | 0.26 | 0.001 | — | — | — | — | — | 0.0035 | 0.0025 | −0.15 |

Formula (1): 2 × [Ti]/[Si] − 50 × [S] . . . (1)
Here, [Ti], [Si], [S] respectively represent contents of Ti, Si, and S relative to a total mass of welding wire.

TABLE 3

| | | | Welding condition | | Evaluation result | | |
|---|---|---|---|---|---|---|---|
| | Test No. | Wire No. | Frequency (Hz) | Slag adhesion | Electrodeposition coating property | Bead shape | Sputter |
| Inventive | 1 | 1 | 90 | ○○ | ○ | ○○ | ○ |
| Example | 2 | 2 | 98 | ○ | ○ | ○ | ○ |
| | 3 | 3 | 70 | ○○ | ○ | ○○ | ○ |
| | 4 | 4 | 73 | ○○ | ○ | ○○ | ○ |
| | 5 | 5 | 105 | ○○ | ○ | ○○ | ○ |
| | 6 | 6 | 110 | ○○ | ○ | ○○ | ○ |
| | 7 | 7 | 95 | ○○ | ○ | ○○ | ○ |
| | 8 | 8 | 92 | ○ | ○ | ○○ | ○ |
| | 9 | 9 | 120 | ○ | ○ | ○ | ○ |
| | 10 | 10 | 118 | ○ | ○○ | ○○ | ○ |
| | 11 | 11 | 90 | ○ | ○○ | ○○ | ○○ |
| | 12 | 12 | 97 | ○ | ○ | ○ | ○ |
| | 13 | 13 | 91 | ○ | ○ | ○ | ○ |
| | 14 | 14 | 88 | ○ | ○ | ○ | ○ |
| | 15 | 15 | 88 | ○ | ○ | ○ | ○ |
| | 16 | 16 | 92 | ○ | ○ | ○ | ○ |
| | 17 | 17 | 95 | ○ | ○ | ○ | ○ |
| | 18 | 18 | 101 | ○ | ○○ | ○○ | ○ |
| | 19 | 19 | 74 | ○ | ○ | ○ | ○ |
| | 20 | 20 | 75 | ○○ | ○○ | ○○ | ○ |
| | 21 | 21 | 88 | ○○ | ○○ | ○ | ○ |

TABLE 3-continued

| | Test No. | Wire No. | Welding condition Frequency (Hz) | Evaluation result Slag adhesion | Electrodeposition coating property | Bead shape | Sputter |
|---|---|---|---|---|---|---|---|
| Comparative | 22 | 22 | 88 | x | x | ○ | ○○ |
| Example | 23 | 23 | 90 | x | x | ○ | ○○ |
| | 24 | 24 | 91 | x | x | ○ | ○ |
| | 25 | 25 | 90 | x | x | ○ | ○ |
| | 26 | 26 | 85 | x | x | ○ | ○ |
| | 27 | 27 | 86 | x | x | ○○ | x |
| | 28 | 28 | 91 | x | ○ | x | x |
| | 29 | 29 | 90 | x | ○ | ○ | x |
| | 30 | 30 | 88 | x | x | ○ | x |
| | 31 | 31 | 91 | x | x | ○ | ○ |
| | 32 | 32 | 86 | x | x | ○ | ○ |
| | 33 | 33 | 98 | x | x | ○ | ○ |

As shown in Tables 1 to 3, in Tests No. 1 to No. 21, the chemical components of the wire, the shielding gas, the frequency of feeding, and the like were within the range of the present invention, so that all the evaluation results were excellent ("○○") or good ("○"). In addition, even when a 100% $CO_2$ shielding gas is used, the slag state and the sputter are excellent, so that the manufacturing cost of the welded structure can be reduced.

On the other hand, in Tests No. 22 to No. 33, at least one of the contents of Si, S, Ti, and N among the chemical components of the wire or the value calculated by the formula (1) was out of the range of the present invention, so that the evaluation result of at least one of the slag adhesion, the electrodeposition coating property, the bead shape, and the spatter was poor ("x"). Tests No. 28 and No. 29 are examples in which the content of N in the wire is not the content of unavoidable impurities, and N is excessively contained.

[Test II]

Inventive Examples (Tests No. 34, No. 35, No. 37, and No. 39 to No. 42) and Comparative Examples (Tests No. 36 and No. 38)

Next, in order to evaluate the influence of the feeding frequency, arc welding was performed on steel sheets by using the wires No. 1, No. 2, No. 12, and No. 17 while alternately switching feeding of the wires between forward feeding and backward feeding at various frequencies, and the slag adhesion, the electrodeposition coating property, the bead shape, and the sputter were evaluated.

The welding conditions other than the feeding frequency were the same as the welding conditions in the test I. The evaluation results are shown in Table 4 below.

TABLE 4

| | Test No. | Wire No. | Welding condition Frequency (Hz) | Evaluation result Slag adhesion | Electrodeposition coating property | Bead shape | Sputter |
|---|---|---|---|---|---|---|---|
| Inventive Example | 34 | 1 | 90 | ○○ | ○ | ○○ | ○ |
| Inventive Example | 35 | 1 | 45 | ○○ | ○ | ○ | ○ |
| Comparative Example | 36 | 1 | 35 | ○○ | ○ | x | x |
| Inventive Example | 37 | 2 | 98 | ○ | ○ | ○ | ○ |
| Comparative Example | 38 | 2 | 38 | ○ | ○ | x | x |
| Inventive Example | 39 | 12 | 72 | ○ | ○ | ○ | ○ |
| Inventive Example | 40 | 12 | 47 | ○ | ○ | ○ | ○ |
| Inventive Example | 41 | 17 | 95 | ○ | ○ | ○ | ○ |
| Inventive Example | 42 | 17 | 72 | ○ | ○ | ○ | ○ |

As shown in Table 4 above, in Tests No. 34, No. 35, No. 37, and No. 39 to No. 42, the feeding frequencies were within the range of the present invention, so that all the evaluation results were excellent ("○○") or good ("○").

On the other hand, in the Tests No. 36 and No. 38 as Comparative Examples, the feeding frequencies were less than the lower limit of the range of the present invention, and thus the evaluation results of the bead shape and the spatter were poor ("x").

[Test III]

Inventive Examples (Tests No. 43 to No. 48) and
Comparative Examples (Tests No. 49 to No. 51)

Next, in order to evaluate the influence of the steel kind, arc welding was performed on the SPH590 steel sheet and the SPH780 steel sheet using the wires No. 1, No. 2, and No. 33, and the slag adhesion, the electrodeposition coating property, the bead shape, and the sputter were evaluated.

The welding conditions other than the steel kind were the same as the welding conditions in the test I. The evaluation results of the arc welding performed on the SPH440 steel sheet and the evaluation results of Test III are shown in Table 5 below.

TABLE 5

| | Test No. | Wire No. | Steel kind | Evaluation result | | | |
| | | | | Slag adhesion | Electrodeposition coating property | Bead shape | Sputter |
|---|---|---|---|---|---|---|---|
| Inventive Example | 43 | 1 | SPH440 | ○○ | ○ | ○○ | ○ |
| | 44 | 1 | SPH590 | ○○ | ○ | ○○ | ○ |
| | 45 | 1 | SPH780 | ○○ | ○○ | ○○ | ○ |
| | 46 | 2 | SPH440 | ○ | ○ | ○ | ○ |
| | 47 | 2 | SPH590 | ○ | ○ | ○ | ○ |
| | 48 | 2 | SPH780 | ○○ | ○○ | ○ | ○ |
| Comparative Example | 49 | 33 | SPH440 | x | x | ○ | ○ |
| | 50 | 33 | SPH590 | x | x | ○ | ○ |
| | 51 | 33 | SPH780 | x | x | ○ | ○ |

As shown in Table 5 above, in Tests No. 43 to No. 48, the chemical components of the wires, the welding conditions, and the like were within the range of the present invention, so that the evaluation results were excellent ("○○") or good ("○") regardless of the steel kind. On the other hand, the wire No. 33, which was the Comparative Example, was used in Tests No. 49 to No. 51, and thus the evaluation results of the slag adhesion and the electrodeposition coating property were poor ("x") regardless of the steel kind for which welding was performed.

From the above results, in the present invention, it is not required to select a welding wire, a welding condition, and the like depending on the steel kind, and the manufacturing cost can be reduced.

Although various embodiments have been described above, it is needless to say that the present invention is not limited to these examples. It is apparent that those skilled in the art can conceive of various modifications and alterations within the scope described in the claims, and it is understood that such modifications and alterations naturally fall within the technical scope of the present invention. In addition, the respective constituent elements in the above-described embodiments may be freely combined without departing from the gist of the invention.

The present application is based on Japanese Patent Application No. 2020-147768 filed on Sep. 2, 2020, contents of which are incorporated herein by reference.

The invention claimed is:

1. An arc welding method, comprising welding a steel sheet while alternately switching feeding of a welding wire between forward feeding and backward feeding,
wherein the welding wire comprises,
with respect to a total mass to the welding wire:
C: more than 0 mass % and 0.30 mass % or less,
Si: 0.01 mass % or more and 0.30 mass % or less,
Mn: 0.5 mass % or more and 2.5 mass % or less,
S: 0.001 mass % or more and 0.020 mass % or less,
Ti: 0.05 mass % or more and 0.30 mass % or less,
P: 0 mass % or more and 0.025 mass % or less,
Cu: 0 mass % or more and 0.50 mass % or less,
Ni: 0 mass % or more and 3.0 mass % or less,
Cr: 0 mass % or more and 3.0 mass % or less,
Mo: 0 mass % or more and 1.0 mass % or less,
Al: 0 mass % or more and 0.30 mass % or less,
B: 0 mass % or more and 0.0100 mass % or less, and
wherein a value obtained by the following formula (1) is more than 1.0, $$2\times[Ti]/[Si]-50\times[S] \tag{1}$$

wherein in the formula (1), [Ti] represents the content (mass %) of Ti with respect to the total mass of the welding wire, [Si] represents the content (mass %) of Si with respect to the total mass of the welding wire, and [S] represents the content (mass %) of S with respect to the total mass of the welding wire, and wherein welding is performed using a shielding gas containing $CO_2$ gas in an amount of 80 vol. % or more with respect to a total volume of the shielding gas at a frequency of 40 Hz or more and 200 Hz or less, where one cycle for determining the frequency is one forward feeding and one backward feeding.

2. The arc welding method according to claim 1, wherein the welding is performed at a peak current of 200 A or more.

3. The arc welding method according to claim 1, wherein the welding is performed using a shielding gas being 100 vol. % of $CO_2$ gas.

4. The arc welding method according to claim 1, wherein the content of Al is 0.01 mass % or more with respect to the total mass of the welding wire.

5. The arc welding method according to claim 1, wherein the content of Mo is 0.01 mass % or more and 0.5 mass % or less with respect to the total mass of the welding wire.

6. The arc welding method according to claim 4, wherein the content of Mo is 0.01 mass % or more and 0.5 mass % or less with respect to the total mass of the welding wire.

7. The arc welding method according to claim 1, wherein the welding wire further contains N, and a content of N is more than 0 mass % and 0.0150 mass % or less with respect to the total mass of the welding wire.

8. The arc welding method according to claim 4, wherein the welding wire further contains N, and a content of N is more than 0 mass % and 0.0150 mass % or less with respect to the total mass of the welding wire.

9. The arc welding method according to claim 5, wherein the welding wire further contains N, and a content of N is more than 0 mass % and 0.0150 mass % or less with respect to the total mass of the welding wire.

10. The arc welding method according to claim 6, wherein the welding wire further contains N, and a content of N is more than 0 mass % and 0.0150 mass % or less with respect to the total mass of the welding wire.

11. The arc welding method according to claim 1, wherein the welding wire further contains O, and a content of O is more than 0 mass % and 0.0200 mass % or less with respect to the total mass of the welding wire.

12. The arc welding method according to claim 4, wherein the welding wire further contains O, and a content of O is more than 0 mass % and 0.0200 mass % or less with respect to the total mass of the welding wire.

13. The arc welding method according to claim 5, wherein the welding wire further contains O, and a content of O is more than 0 mass % and 0.0200 mass % or less with respect to the total mass of the welding wire.

14. The arc welding method according to claim 6, wherein the welding wire further contains O, and, a content of O with respect to the total mass of the welding wire is more than 0 mass % and 0.0200 mass % or less.

15. The arc welding method according to claim 7, wherein the welding wire further contains O, and a content of O is more than 0 mass % and 0.0200 mass % or less with respect to the total mass of the welding wire.

16. The arc welding method according to claim 8, wherein the welding wire further contains O, and, a content of O is more than 0 mass % and 0.0200 mass % or less with respect to the total mass of the welding wire.

17. The arc welding method according to claim 9, wherein the welding wire further contains O, and a content of O is more than 0 mass % and 0.0200 mass % or less with respect to the total mass of the welding wire.

18. The arc welding method according to claim 10, wherein the welding wire further contains O, and a content of O is more than 0 mass % and 0.0200 mass % or less with respect to the total mass of the welding wire.

19. The arc welding method according to claim 1, wherein the steel sheet has a thickness of 0.6 mm or more and 6 mm or less.

* * * * *